Aug. 6, 1940.    F. C. BEST    2,210,111
BRAKE MECHANISM
Filed Oct. 20, 1937
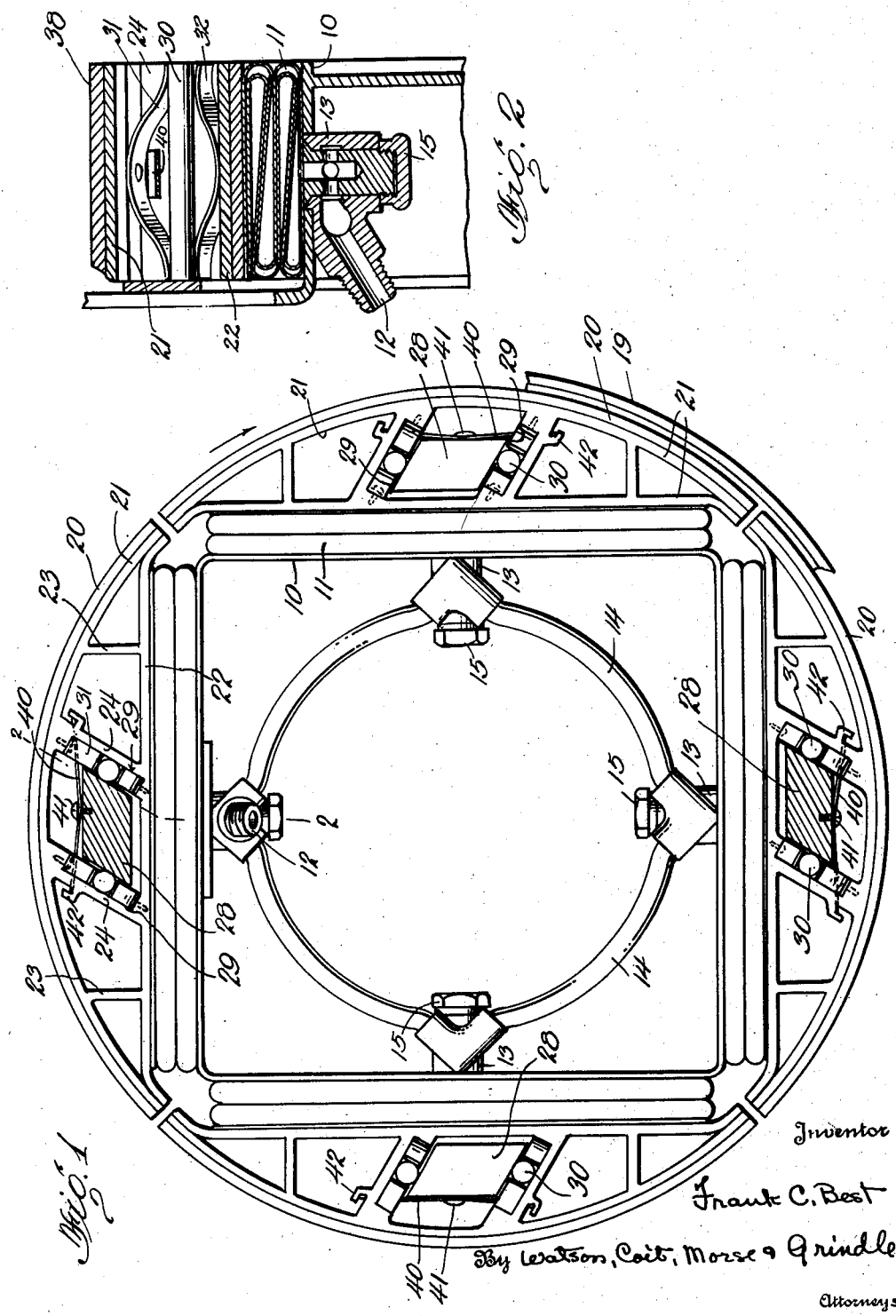
Inventor
Frank C. Best
By Watson, Coit, Morse & Grindle
Attorneys Patented Aug. 6, 1940

2,210,111

UNITED STATES PATENT OFFICE 2,210,111

BRAKE MECHANISM

Frank C. Best, Detroit, Mich., assignor to Packard Motor Car Company, Detroit, Mich., a corporation of Michigan Application October 20, 1937, Serial No. 170,128

8 Claims. (Cl. 188—152)

This invention relates to brake mechanism and more particularly to mechanism of the type in which a plurality of brake shoes are simultaneously displaced in a radially outward direction in response to the application thereto of fluid under pressure, commonly referred to as the Linderman brake. It is the principal object of the invention to improve the function and structure of brakes of this character.

In this type of brake each of the friction shoes is formed to provide an opening in which an anchor block, secured to the brake backing plate, extends. These blocks are customarily provided with guide surfaces disposed in planes parallel to a plane intersecting the axis of the drum and lying intermediate the surfaces. Consequently, the braking pressure, when the shoes are engaged with the brake drum, produces a force against the aforesaid surfaces of the anchor blocks which acts substantially radially thereto, and it is found that the cooperating surfaces of the anchor blocks and brake shoes frequently adhere as the result of this pressure, and the shoes are not readily released from frictional engagement with the drum while the vehicle is in motion.

It is a further feature of the invention that these cooperating surfaces are inclined outwardly with respect to a plane intersecting the brake axis and in the direction in which the wheel rotates during forward movement of the vehicle. As the result of this inclination the frictional contact between the brake shoes and the drum produces a force which acts against the surface of the anchor block and which has a radial outward component. Consequently, the pressure between the brake shoes and the drum, once established, tends to be increased automatically; in other words, a servo action is very simply and effectively produced.

Further objects and features of the invention will be apparent from the following description taken in connection with the accompanying drawing, in which Figure 1 is a transverse sectional view of a brake of the character hereinbefore described, certain parts having been omitted for the purpose of simplifying the illustration; and Figure 2 is a partial sectional view taken substantially on the line 2—2 of Figure 1.

In order to facilitate an understanding of the invention, reference is made herein to the embodiment thereof illustrated in the drawing and specific language is employed to describe the same. It will nevertheless be appreciated that no limitation of the invention is thereby intended, but that various modifications and alterations, such as would occur to one skilled in the art, are contemplated as part of the present invention.

In Figure 1 of the drawing is represented a portion of the internal structure of a brake mechanism, this mechanism including a stationary, rectangular frame member 10, supported on the brake backing plate, on the exterior of each side of which is disposed a bellows or other expansible device 11, each of the bellows being in communication with the fluid system under pressure including conduits 13 and a supply duct 12 for these conduits, the conduits 13 being connected with passages 14 and plug members 15 which extend through and are seated in apertures in the several sides of the member 10 and which are in open communication with the interior of each of the bellows 11. The means operated by each of these bellows is preferably the same and only one will be described, it being understood that the construction may be duplicated at each side of the rectangular frame 10.

Thus each brake shoe may comprise a suitable friction lining 20 which is secured in any convenient manner to a segmental metal element 21. Secured rigidly to or formed integral with the member 21 is a plate 22 which is disposed parallel to the adjacent side of the frame 10 and engages the outer face of the bellows. Reinforcing webs 23 and further webs 24, hereinafter more particularly referred to, serve to connect the member 21 and the plate 22 to form a rigid substantially sector-shaped shoe. It will be understood that when fluid under pressure is admitted to the bellows 11, the latter are expanded and the several shoes are forced radially outward into contact with the drum 19.

In order to retain each of the shoes against circumferential displacement and to guide the same in its outward movement it is customary, as hereinbefore pointed out, to provide anchor blocks extending axially from the brake backing plates and between and into contact with the webs 24 of the brake shoe. In the present construction the webs 24 are inclined outwardly in the direction of rotation of the wheel when the vehicle is moving forwardly so as to define planes which intersect at an angle a plane passing between the webs and containing the axis of the brake and of the associated wheel. The anchor block 28 is provided with similarly inclined lateral faces 29 and is of such dimensions that these faces are spaced from the opposed surfaces of the webs 24. Intermediate each surface 29 and the adjacent web is positioned an anti-friction roller 30, and each roller is retained in approximately its correct position by means of springs 31 and 32, the former engaging at its ends with the roller and being secured at its intermediate portion to the element 21 and the other of these springs similarly engaging at its ends with the roller 30 and being secured at its intermediate portion to the plate 22. By the action of these springs each roller is maintained normally approximately midway between the plates 22 and 38, but is permitted to roll freely on the anchor block 28 and the adjacent web 24 when the brake shoe is displaced outwardly. By means of these rollers friction between the anchor blocks and the brake shoes is reduced to a minimum and possibility of locking of the brakes in their applied position is definitely avoided.

It will also be observed that when the brake shoes are engaged with the brake drum, and the wheel is rotating in a clockwise direction as indicated by the arrow with the vehicle moving forwardly, each brake shoe tends to move radially outward on the leading surface 29 of the associated anchor block 28, thereby increasing the pressure between the shoes and the drum and employing the momentum of rotation of the wheels for this purpose. It is quite apparent that with this arrangement a minimum of effort in the manual application of the brakes is required in order that a maximum braking effect may be obtained, it being only necessary to apply sufficient pressure to the brake pedal to displace the shoes into contact with the drum. Once this engagement is established, the vehicle momentum suffices to increase the pressure, and this increase in pressure is generally proportional to the speed with which the vehicle is moving.

The brake shoes may be returned to their normal or released position after actuation by any convenient means. For example, a flat spring 40, secured to the anchor block 28 as indicated at 41 engages at its ends in lugs 42 formed integrally with webs 24, this spring being biased so as to normally urge the associated brake shoe inwardly and to maintain the same out of contact with the drum until fluid under pressure is admitted to the bellows.

In order to simplify the illustration of the novel features of the invention, only a few of the essential parts of the brake mechanism have been illustrated herein. Again, it will be appreciated that the details of the illustrated parts may be altered to a considerable extent and that the invention is applicable to other types of brakes than that selected for the purpose of illustration.

Having thus described the invention, what is claimed as new and desired to be secured by Letters Patent is:

1. In a brake mechanism, the combination with a brake drum, of a movable shoe for engagement with said drum, means guiding said shoe in a predetermined path, said means including a relatively stationary anchor block having lateral guide surfaces inclined to the radial, and anti-friction devices disposed between and having rolling engagement with said surfaces and said shoe.

2. In a brake mechanism of the type provided with a brake backing plate, a plurality of outwardly movable, fluid pressure operated shoes and a brake drum having a cylindrical internal surface engageable by said shoes, guide means for each of said shoes, said guide means comprising an anchor block extending within the associated shoe and having lateral surfaces thereon for engagement with cooperating surfaces on the said shoe, said surfaces being so inclined to impart to said shoes as the latter move outwardly, a component of movement in the direction of rotation of the wheel when the vehicle is moving forwardly.

3. In a brake mechanism of the type provided with a brake backing plate, a plurality of outwardly movable, fluid pressure operated shoes and a brake drum having a cylindrical internal surface engageable by said shoes, guide means for each of said shoes, said guide means comprising an anchor block extending within the associated shoe and having lateral surfaces thereon inclined to the radial for engagement with cooperating surfaces on the said shoe, and anti-friction means having rolling engagement with said surfaces.

4. In a brake mechanism of the type provided with a brake backing plate, a plurality of outwardly movable, fluid pressure operated shoes and a brake drum having a cylindrical internal surface engageable by said shoes, guide means for each of said shoes, said guide means comprising an anchor block extending within the associated shoe and having lateral surfaces thereon for engagement with cooperating surfaces on the said shoe, anti-friction means between said surfaces, and spring means for normally maintaining said anti-friction means spaced from the ends of said surfaces.

5. In a brake mechanism of the type provided with a brake backing plate, a plurality of outwardly movable, fluid pressure operated shoes and a brake drum having a cylindrical internal surface engageable by said shoes, guide means for each of said shoes, said guide means comprising an anchor block extending within the associated shoe and having lateral surfaces thereon for engagement with cooperating surfaces on the said shoe, said surfaces being so inclined to impart to said shoes as the latter move outwardly, a component of movement in a direction opposite to the direction of rotation of the wheel when the vehicle is moving forwardly, and anti-friction means between said surfaces.

6. In a brake mechanism, the combination with a brake drum, of a movable shoe having a braking surface for engagement with said drum, and means guiding said shoe in a predetermined linear path such that the central portion of the braking surface of said shoe moves in a direction inclined at an acute angle to the radial, and means for exerting a generally radial thrust on said shoe to engage the latter with said drum.

7. In a brake mechanism, the combination with a brake drum, of a movable shoe having a braking surface for engagement with said drum, means guiding said shoe in a predetermined linear path such that the central portion of the braking surface of said shoe moves in a direction inclined at an acute angle to the radial, said means including a relatively stationary anchor block having lateral guide surfaces, and anti-friction devices acting between said surfaces and said shoe.

8. In a brake mechanism, the combination with a brake drum, of a movable shoe for engagement with said drum, and means guiding said shoe in a path inclined at an acute angle to a plane containing the brake axis and passing through the central portion of said shoe, said means including a relatively stationary anchor block having lateral guide surfaces, said surfaces being inclined to form an acute angle with radii intersecting said surfaces.

FRANK C. BEST.